Patented Jan. 27, 1948

2,434,906

UNITED STATES PATENT OFFICE 2,434,906

METHOD OF PLASTICIZING PROTEINS AND PRODUCTS THEREOF

Richard Paul Carlton and Howard C. Brinker, St. Paul, Minn., assignors to Minnesota Mining & Manufacturing Company, St. Paul, Minn., a corporation of Delaware No Drawing. Application February 22, 1943, Serial No. 476,762

15 Claims. (Cl. 106—161)

This invention relates to the treatment of proteins; more particularly to the plasticizing of proteins or protein-like materials, especially polyamides, to render them flexible, without regard to their moisture content.

This application is a continuation-in-part of our copending application Serial No. 179,332, filed December 11, 1937, now abandoned.

The plasticizers for proteins of the character of glue, casein, etc., known to the art are the polyhydric alcohols, alkali metal salts of sulfuric acid esters of higher alcohols or fatty oils such as Turkey red oil, glycerine and the like. Their inherent characteristics are such that they depend mainly upon their hygroscopicity for their plasticizing action, and it may be seen that proteins plasticized, as with the above ingredients, will tend to become hard and dry under arid or semi-arid conditions.

It is therefore an object of this invention to provide a plasticizer which will render a protein substance flexible irrespective of its water content.

Furthermore, our improved plasticized protein composition is more stable at high temperatures than plasticized protein compositions at present available.

Broadly setting forth our invention in general terms, we have discovered how to produce a plasticized protein composition which will remain flexible and plastic in the absence of moisture in the ambient atmosphere. These plasticized materials may be formed into sheets or films, and transparent sheeted compositions of this type can be produced in accordance herewith. While certain other substances can undoubtedly be found which can be used with and/or worked into protein or protein-like molecules to accomplish the results herein described, we have found certain materials which provide this new and useful result. This result, to the best of our knowledge, was heretofore unattained by any means or method: see "Casein and Its Industrial Applications" by Sutermeister and Browne, published by the Reinhold Publishing Corp. in 1939, i. e. subsequent to the filing of our aforesaid parent application. We have found, as illustrations, that various amides, amines, and their derivatives, have the property of plasticizing protein and protein-like substances. More specifically, satisfactory results have been obtained by employing, as protein plasticizers, substances which fall within four general classes, namely: (a) amides, (b) amines, (c) amino alcohols and (d) amino sodium sulphonates. Still more specifically, of the amides, formanilide ($C_6H_5NHCHO$) and formicin ($CH_3CONHCH_2OH$) have been found to be very satisfactory as protein plasticizers, especially the formanilide.

Of the amines, phenylbenzylamine ($C_6H_5NHCH_2C_6H_5$)

and cyclohexylamine ($C_6H_{11}NH_2$), have been found to be fairly satisfactory for this purpose, but, with the possible exception of phenylbenzylamine, they are quite volatile and prove most successful when the plasticized protein substance is to be used immediately after plasticization or shortly thereafter, or where this plasticized material may be stored in suitable containers or under pressure for future use. It will be apparent, however, that materials which are volatile under room or atmospheric conditions cannot in any event serve to yield a composition which, e. g. in the form of a film, sheet or wrapping, will remain flexible and plastic when exposed to an ambient atmosphere at such temperatures, and in the absence of moisture.

Ethylene diamine diethanol, ethylene diamine tetraethanol, salicanilide, glycanilide, and phenyl glycol amine ($C_6H_5NHCHOHCH_2OH$), have also been found to have some utility in this connection, although formanilide is preferable thereto. Of these materials glycanilide and salicanilide are preferred, for one reason because they are stable and non-volatile under room temperatures and summer heat. The amino alcohols in general are quite volatile, while derivatives of phenyl glycine are not stable and therefore prove most satisfactory when used as stated in the foregoing paragraph.

Of the amino sodium sulphonates, phenylmethyleneamine sodium sulphonate ($C_6H_5NHCH_2OSO_2Na$)

phenyl octylene amine sodium sulphonate ($C_6H_5NHC_8H_{16}OSO_2Na$)

phenyl isopropyleneamine sodium sulphonate ($C_6H_5NHC(CH_3)_2OSO_2Na$)

and phenyl methylene amine sodium sulfinate ($C_6H_5NHCH_2SO_2Na$) have been found to be fairly satisfactory. These likewise are not stable compounds, and are not satisfactory for materials that should remain plasticized over an extended period of time.

The most desirable of the above type materials, when used for plasticizing a protein, preferably of a type which may be swelled by water, as for example casein, hide and bone glues, ossein gelatines, glue from sinews, or zein and albumins and the like, have the property of rendering the protein flexible even when no water is present. More specifically, for example, formanilide or derivatives of formanilide, will plasticize proteins so that a mixture of protein and formanilide is flexible when dry under ordinary atmospheric conditions.

These and other materials of this character will plasticize the protein substance when completely dry, but some of them act more readily when the protein contains a small percentage of moisture. Therefore, for securing the most desirable results, with materials of the above character requiring a slight moisture content, we desire to augment our protein and amine derivative mixture with other substances, which may or may not in themselves have a plasticizing action. However, we prefer augmenting-plasticizer agents of the type of Turkey red oil. Likewise, these augmenting substances may be the ammonia, substituted ammonia such as triethanolamine or alkali metal salts of the acid sulfuric acid ester of higher alcohols, fatty oils, fatty oil acids, and the like. Compounds containing more than one hydroxyl group per molecule may also be used as augmenting agents, as for example diethyleneglycol glycerol, or similar compounds.

For example, other augmenting agents which may be employed are, fatty alcohols, fatty oils or fatty oil acids which may be combined with phosphoric acid to form an acid ester. This ester may be combined with an alkali metal, ammonia or organic base to form a product that may be used in place of a similar one made using a sulfuric acid ester such as Turkey red oil.

In practice, plasticizing proteins of a character as herein set forth by means of various amides or substituted amines with or without the addition of augmenting agents may be accomplished by addition of the plasticizing and/or augmenting agents to a dehydrated protein. However, we preferably swell the proteins with water for more readily securing plasticization of the protein, as a hydrated protein is more rapidly plasticized due to the penetration of the plasticizing ingredient and augmenting agent, if used. After application of the plasticizing substance, any excess water may be removed by drying the final plasticized film under ordinary atmospheric conditions.

To better illustrate the nature of this invention, if it is desired to use protein as a coating material, film, sheet, or the like, the hardness of the coating may be varied by varying the relative proportion of the ingredients; for example, if a relatively hard finish is required, we may prepare our mixture in approximate proportionate parts as follows:

| | Parts |
|---|---|
| Protein | 67 |
| Formanilide | 28 |
| Turkey red oil | 4 | prepared by mixing the protein, either in a hydrated or dehydrated condition, with its plasticizing and augmenting-plasticizer agent until a uniform mixture wherein the protein is thoroughly saturated is obtained whereupon it is ready for application by any suitable means as a coating or filling material.

A composition forming a fairly hard product consisting of the following in approximate proportionate parts:

| | Parts |
|---|---|
| Protein | 55 |
| Formanilide | 35 |
| Turkey red oil | 10 | may be prepared by mixing the ingredients by any suitable means until the protein is thoroughly saturated and ready for application.

Further illustrative of the nature of this disclosure in using a protein composition for the treatment of paper or cloth materials as in the production of tapes, coverings, finishing materials, and the like, we may, if we desire a relatively hard material, prepare a composition by mixing the following ingredients in approximate proportionate parts:

| | Parts |
|---|---|
| Protein | 35 |
| Formanilide | 38 |
| Turkey red oil | 25 | or for securing a fairly flexible treated material, we prepare a composition by suitable mixing consisting of the following in approximate proportionate parts:

| | Parts |
|---|---|
| Protein | 40 |
| Formanilide | 30 |
| Turkey red oil | 30 |

In the above formulas glycanilide or salicanilide or lactic amide may be substituted for the formanilide with similar or parallel results. Also any of the group of amides, amines, their derivatives and equivalents, as herein set forth, may be employed in lieu of some or all of the formanilide, glycanilide, etc., with correspondingly varying results.

In the above descriptions, while we have illustrated the use of varying proportions of an augmenting ingredient, it is to be understood that we may plasticize a glue or other protein or protein-like substance with various amides, amines, and their derivatives having the property of plasticizing the protein substances, such amides or substituted amides as formanilide, formicin, glycanilide and the like, rendering the protein flexible and plasticized even when no water is present. Likewise, in their use these materials or augmenting agents, as herein disclosed, may sometimes be aided by a reaction material or a neutralizing material in their application, as for example in some cases a reaction product may be formed between the agent and a dextrose; or, as with triethanolamine, a castor oil free fatty acid, sulfonated, and washed, may be used for neutralizing the triethanolamine.

A composition formed of the protein and its plasticizer without an augmenting agent is determined by the degree of flexibility desired, as for example when desiring a relatively hard film, we may use a greater percentage of protein than of its plasticizer, as formanilide or the like. This composition may consist of the following in approximate proportionate parts:

| | Parts |
|---|---|
| Protein | 60 |
| Plasticizer | 40 | prepared by mixing the protein in a hydrated or dehydrated state with its plasticizer until the protein is thoroughly saturated and then drying at atmospheric conditions.

As will be readily recognized, increasing or decreasing the proportionate parts of plasticizer agents of the nature herein described will increase or decrease the flexibility of the protein proportionately, and it is to be understood that mixtures as represented by the ingredients as illustrated herein may be used in such fields as printers' rolls, transparent flexible films or sheets, flexible sheets of protein mixtures, for treatments of paper, cloth, felts or the like in the development of shades, artificial leathers, decorative coverings, abrasive backings, tape backings, protective coverings, label adhesives, and many others, the composition and plasticity of the protein being determined in accordance with its use. Where toxicity is avoided, food wrappings and the like can also be made advantageously in accordance herewith.

In choosing the proper plasticizing agent of a nature as herein set forth, care must be taken to select a substance for the particular usage expected which is not too volatile, thereby upon exposure destroying the plasticizing effect due to its evaporation, or where upon its usage the need for plasticity is temporary. It is further preferable to use compounds not strongly alkaline, and preferably having a pH of the order of 7, e. g. 6.5 to 7.5.

It will be further understood that if desired the protein plasticized compositions as herein described may be rendered water insoluble by treatment with acetaldehyde or formaldehyde or other tanning agents in the usual manner as practiced by the trade for the treatment of a protein substance.

We have also employed various of our plasticizing agents to plasticize "nylon," a linear polyamide manufactured by E. I. du Pont de Nemours & Co., Wilmington, Delaware, and described in various U. S. patents such as various of the patents of Wallace H. Carothers, illustrative of which are Nos. 2,071,251 and 2,071,253.

One illustration of our procedure for improving the flexibility of nylon involved employing

| | Parts |
|---|---|
| Nylon | 3¼ |
| Phenol, 90% (as solvent) | 12 |
| Formanilide | 0.3 |

This formed an entirely homogeneous mixture on warming to 50° C. The material obtained, after evaporating the phenol from this, is definitely more flexible than nylon alone. Nylon and our plasticizing agents like formanilide are compatible on warming. Amounts of such plasticizer of the order of 10 percent of the composition improves the flexibility of the nylon, whereas if formanilide or the like were used to the extent of 50 percent (i. e. in a proportion equal to that of the nylon) the nylon is weakened.

Another illustrative plasticized nylon composition which we produced is:

| | Parts |
|---|---|
| Nylon | 5 |
| Phenol | 15 |
| Glycanilide | 0.5 |

The composition formed a compatible solution on warming to 100° C. When the phenol was evaporated, the resulting product was found to be definitely more flexible than nylon alone, the glycanilide being compatible with the nylon and acting as a plasticizer therefor.

Unless otherwise stated, all proportions herein are by weight.

In describing this invention, we have used specific ingredients to better illustrate the principles involved, and it is to be clearly understood that our discovery of an improved plasticized protein composition as set forth herein is not limited to the specific ingredients or proportions thereof. Varied compositions having the novel characteristics herein described and/or claimed are likewise contemplated.

What we claim is:

1. A composition of matter comprising a protein plasticized with a material containing an ammonia derivative comprising formanilide.

2. A composition of matter comprising a protein plasticized with a material containing an ammonia derivative having the grouping

in which the "R" group is an aromatic radical and the free valence of the carbonyl carbon atom is satisfied by a radical from the group consisting of a hydrogen atom and radicals containing oxygen.

3. A composition of matter comprising a protein plasticized with a material comprising an ammonia derivative having the grouping,

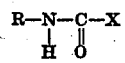

in which X is a radical containing oxygen and R is an aromatic radical, said ammonia derivative being approximately neutral, i. e. having a pH of the order of 7.

4. A composition of matter comprising a protein and a material comprising an ammonia derivative and having the grouping

in which "R" is an aryl group and a radical containing a hydroxyl group is joined to the carbonyl carbon atom.

5. A composition of matter comprising a protein and a plasticizer therefor containing an aryl substituted amide having the grouping

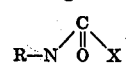

in which "X" is an aliphatic radical of low molecular weight containing oxygen and in which "R" is a radical from the group consisting of aromatic radicals and oxygen-containing aliphatic radicals.

6. A composition of matter comprising a protein plasticized with a material containing an amide having the grouping

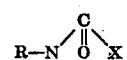

in which "R" represents an aryl group and "X" is a radical from the group consisting of hydrogen and oxygen-containing radicals, and said amide having a melting point at least substantially as low as that of formanilide.

7. A composition of matter comprising a protein plasticized with a material containing an amide having the grouping

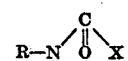

in which "R" represents an aryl group and "X" is a radical from the group consisting of hydrogen and oxygen-containing radicals, and an augmenting agent for said amide, said augmenting agent having a substantially lower melting point than said amide and being compatible with the latter and also being substantially chemically inert to said protein.

8. A composition of matter comprising a protein plasticized with a material containing an ammonia derivative comprising formanilide and an augmenting agent for said formanilide, said augmenting agent being a liquid at room temperatures and being compatible with said formanilide and also substantially chemically inert to said protein, said composition being substantially free of crystallized formanilide.

9. A composition of matter composed of protein and a plasticizing agent, the latter comprising a non-hygroscopic ammonia derivative including a substituted amide having the grouping

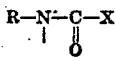

where "R" is a radical from the group consisting of aromatic radicals and oxygen-containing aliphatic radicals and, where "X" is from the group consisting of oxygen-containing radicals and hydrogen, and an augmenting agent therefor, said augmenting agent being an organic compound having at least one hydroxyl group, being a liquid at room temperatures and being compatible with said amide and also substantially chemically inert to said protein, said non-hygroscopic ammonia derivative of the amide class having a melting point of the order of that of formanilide and being present to an extent by weight at least substantially as great as that of said augmenting agent.

10. A flexible protein composition comprising protein plasticized with a material containing an ammonia derivative having the grouping

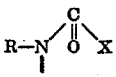

in which "R" is an aryl group and "X" is a radical from the group consisting of hydrogen and oxygen-containing radicals of low weight and then insolubilized by the use of a tanning agent.

11. A composition of matter comprising a protein plasticized with a material containing an ammonia derivative comprising both an amide and an amino-alcohol, said amide and amino-alcohol both having the grouping

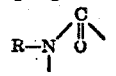

where "R" is an aryl group.

12. A composition of matter comprising a protein plasticized with a material containing an ammonia derivative having the grouping

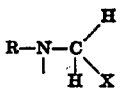

in which "R" is an aryl group and "X" is the radical "OSO$_2$Y", "Y" being an alkali radical.

13. The process of producing a flexible protein product which comprises plasticizing a hydrated protein with an agent containing an amide having the grouping

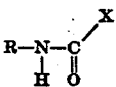

in which "R" is an aryl group, and "X" is chosen from the group consisting of oxygen-containing aliphatic radicals and hydrogen, forming the plasticized protein composition into desired shape and then drying the same at temperatures of the order of atmospheric temperatures.

14. A composition of matter comprising protein and a non-hygroscopic plasticizer therefor, said plasticizer being an amide having a melting point of the order of that of formanilide or lower and having the formula

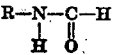

where "R" is a radical from the group consisting of aromatic radicals and oxygen-containing aliphatic radicals, said amide being approximately netural, i. e. having a pH of the order of 7.

15. A new article of manufacture including a protective film comprising protein plasticized as defined in claim 14.

RICHARD PAUL CARLTON.
HOWARD C. BRINKER.

REFERENCES CITED

The following references are of record in the file of this patent:

UNITED STATES PATENTS

| Number | Name | Date |
|---|---|---|
| 2,276,437 | Vaala | Mar. 17, 1942 |
| 1,775,175 | Schmidt et al. | Sept. 9, 1930 |
| 2,115,716 | Hausen | May 3, 1938 |
| 2,101,574 | Dangelmajer | Dec. 7, 1937 |
| 2,225,605 | Lubs | Dec. 17, 1940 |